(12) United States Patent
Franke

(10) Patent No.: US 6,225,483 B1
(45) Date of Patent: May 1, 2001

(54) COLD SOLVENT EXTRACTION PROCESS FOR EXTRACTING OIL FROM OIL-BEARING MATERIALS

(76) Inventor: Henry L Franke, 5340 No. Palo Cristi, Paradise Valley, AZ (US) 85253

( * ) Notice: Subject to any disclaimer, the term of this patent is extended or adjusted under 35 U.S.C. 154(b) by 0 days.

(21) Appl. No.: 09/321,958

(22) Filed: May 28, 1999

Related U.S. Application Data

(60) Provisional application No. 60/087,492, filed on Jun. 1, 1998.

(51) Int. Cl.$^7$ ........................................................ G11B 1/00
(52) U.S. Cl. ................................ 554/16; 554/11; 554/12; 554/20; 426/417; 426/425; 426/429; 426/474; 426/489
(58) Field of Search ................................... 554/11, 12, 16, 554/20

(56) References Cited

U.S. PATENT DOCUMENTS 5,980,964 * 11/1999 Walters et al. ........................ 426/417

* cited by examiner

Primary Examiner—Deborah D. Carr

(57) ABSTRACT

A process for removing oil from oil-bearing material at substantially atmospheric pressure and are relatively low temperatures. The preferred temperature is the boiling point of the solvent, particularly a normally gaseous solvent, at about atmospheric pressure. This temperature will typically be below the freezing point of water.

27 Claims, No Drawings

COLD SOLVENT EXTRACTION PROCESS FOR EXTRACTING OIL FROM OIL-BEARING MATERIALS

This application claims the benefit of provisional No. 60/087,492 filed Jun. 1, 1998.

FIELD OF THE INVENTION

The present invention relates to a process for removing oil from oil-bearing material at substantially atmospheric pressure and at relatively low temperatures. The preferred temperature is the boiling point of the solvent, particularly a normally gaseous solvent, at about atmospheric pressure. This temperature will typically be below the freezing point of water.

BACKGROUND OF THE INVENTION

In many instances the characteristics of a particular naturally occurring organic material, such as agricultural, animal and seafood based products can be altered by the removal of certain components soluble in organic solvents. Non-limiting examples of such components include: phospholipids, fish oils, plant oils, fats, fatty acids, alcohols, cholesterol, waxes, gums, stearoids, oil soluble proteins, flavonol, essential oils, natural dyes, and PCBs.

More particularly, oils derived from plant materials, such as oil-seeds, cereal brans, fruits, beans, and nuts, as well as fish oils, are the source of raw material for many important commercial products. For example, oils from plant materials are extensively used in cooking, in cosmetics, pharmaceuticals, as carriers for insecticides and fungicides, in lubricants, in drilling muds, and in myriad other useful products. Consequently, much work has been done over the years in developing improved processes for extracting oil from such materials.

One of the most widely used processes for removing oil from oil-bearing naturally occurring organic materials is solvent extraction. In solvent extraction, the oil-bearing material is treated with a suitable solvent, usually the lower carbon alkanes, at elevated temperatures and pressures, to extract the oil from the oil-bearing material. The resulting solvent/oil mixture is then frationated to separate the valuable oil from the solvent, which is recycled. Most solvent extraction processes in commercial use today employ hexane or carbon dioxide as the solvent. While hexane extraction is the most widely used today, there are also teachings in the art in which normally gaseous solvents are used at both supercritical and subcritical conditions.

One such teaching is found in U.S. Pat. No. 1,802,533 to Reid, wherein a normally gaseous solvent, preferably butane or isobutane, is liquefied by decreasing the temperature and/or increasing the pressure, then passing the solvent through a bed of the oil-bearing material in an extraction vessel. The solvent and extracted oil are then passed to a still where the solvent is separated from the oil. The extracted material must then be placed in another still where it is heated to remove solvent which remained entrained in the extracted material. There is no suggestion of obtaining a substantially solvent-free, dry, extracted material without an additional treatment step after extraction.

Another extraction process is taught in U.S. Pat. No. 2,548,434 to Leaders wherein an oil-bearing material is introduced into the top of an extraction tower and passed counter-current to a liquefied normally gaseous solvent, such as propane, which is introduced at the bottom of the extraction tower. The tower is operated near critical conditions so that the solvent selectively rejects undesired color bodies, phosphatides, gums, etc. The resulting solvent/oil mixture can then be flashed to separate the solvent from the oil. In another embodiment, the solvent/oil mixture is first subjected to a liquid/liquid separation resulting in one fraction containing solvent and a less saturated fatty material, and another fraction containing solvent and a more saturated fatty material. The solvent is then flashed from both fractions. The extracted material remaining in the tower is drawn off and subjected to a vacuum flashing operation to remove entrained solvent.

Also, U.S. Pat. No. 4,331,695 to Zosel teaches a process for extracting fats and oils from oil-bearing animal and vegetable materials. The material is contacted with a solvent, such as propane, in the liquid phase and at a temperature below the critical temperature of the solvent to extract fat or oil from the material. The resulting solvent/oil mixture is treated to precipitate the extracted fat or oil from the solvent by heating the solvent to above the critical temperature of the solvent without taking up heat of vaporization. The extracted residue (shreds) is then treated to remove any entrained solvent, either by blowing it directly with steam, or by indirect heating followed by direct steaming.

In U.S. Pat. No. 5,041,245 to Benado, a continuous solvent extraction method utilizing propane is disclosed to remove oils from vegetable matter, particularly rice bran. According to this method, a sufficient amount of liquid sealing medium is first injected into the vegetable matter in a feeding zone to form a dough-like plastic mass which is compacted and transported by a conveyor assembly to an extraction zone to form a bed. Propane is then introduced into the bed of the extraction zone being operated at 102°–122° F. and 125–250 psig to react with the bed of material. The micella of extracted oil and solvent resulting from this from the reaction of propane and bed material is then separated from the remaining solid residue of the bed material. The propane is then separated from the extracted oil by evaporation or volatilization methods. The preferred separation method is to first subject the micella near its critical pressure (600 psig for propane/rice bran oil mixture) and significantly elevated temperature (190–200° F. for propane/rice bran oil mixture) which can also be near critical. This yields a high solvent light phase (98% solvent, 2% bran oil) and an oil-enriched heavy phase (60% solvent, 40% bran oil). The enriched heavy phase under reduced pressure is then delivered to a heater-evaporator and further treated to form a more oil-enriched heavy phase (10% solvent, 90% bran oil). This phase is then de-pressurized to about one atmosphere, and further treated in a second combined heater-evaporator stage to produce an oil stream having not more than 1–2% propane. Further, similar treatment of this oil stream could be accomplished to remove additional propane if desired.

Other references which teach solvent extraction of oil-bearing materials, with normally gaseous solvents, include U.S. Pat. No. 2,682,551 to Miller, and U.S. Pat. No. 2,560,935 to Dickinson. In each of these processes, the extracted material must be further processed to remove entrained solvent.

Furthermore, there is a great demand for reduced fat prepared food products, especially vegetable and animal-derived fried food products, such as potato chips, fried fast food products, and cheeses. Consequently, the food industry is spending substantial sums of money to bring such products to market. One challenge, particularly for fast food producers is to make a product which is substantially reduced in fat content, but which is still appealing to consumers' taste buds. All too often, these two competing interests are mutually exclusive. There are no commercial processes available wherein vegetable and animal-based food products are first fried, then treated to remove oil, particularly the cooking oil used for frying and still have a good tasting food product. It is conventional wisdom in the food industry that in order to produce a reduced fat food product a process other than frying in cooking oil must be used.

There have been numerous processes proposed to produce snack food products having the palate appeal of fried food products, but being substantially fat-free. Unfortunately, none of these processes has met with a great deal of success. The typical commercial process attempts to produce a food product, such as potato chips without frying, but which they hope will have the flavor of fried products.

For example, U.S. Pat. No. 4,756,916 teaches a process for producing low-fat potato chips comprising washing potato slices with an aqueous solution, then applying oil to the washed slices to coat the slices with oil. The amount of oil applied to the washed slices is adjusted to achieve an oil content of about 10 to 25 wt. % in the final product. The oil coated slices are blanched, essentially pre-frying the slices due to the oil coating, then baked at a temperature of at least about 390° F. to partially dry the slices. The partially dried potato slices are then baked at a temperature of about 290° F. (140° C.) to 320° F. (160° C.) to finish drying the slices.

Another technique is taught in U.S. Pat. No. 4,906,483 which is directed to a process for producing potato products having no-fat, no-cholesterol, and no salt ingredient characteristics. This is done by placing a pan, containing previously rinsed and sliced potatoes submerged in water, into a microwave oven until the submerged potatoes are visibly transparent. The hot water is then replaced with cold water to remove visible starch. The potatoes are rinsed and arranged on a non-stick cooking sheet and placed in a conventional oven for browning and crisping. Such a process fails to achieve the taste benefits that would be derived from frying the potatoes in cooking oil. Furthermore, extra steps are needed wherein a microwave and a conventional oven are used. Similarly, U.S. Pat. No. 5,202,139 discloses a process for preparing essentially fat-free potato chips. The process involves slicing and washing raw potatoes, pre-drying and arranging the sliced potatoes on a conveyor, then exposing them to a high intensity microwave field. The potato slices are then seasoned and exposed to a lower intensity microwave field. Such a process is not only limited by the fact that it does not achieve the taste advantage from frying, but the process itself is limited to producing only a single layer of product at a time. This limitation is due to the nature of microwave cooling and thus will result in less efficient chip production than a process that can cook or fry multiple layers of sliced food product.

Further, U.S. Pat. No. 4,919,965 discloses a method of toasting agricultural produce slices and, more particularly, potato slices. The toasting process takes place by the use of compressive, opposed, contact surfaces which toast the sliced produce in a fat and oil-free environment. More specifically, the process of this reference includes washing raw agricultural produce, then slicing the produce into thin slices. A seasoning is then applied to the slices which are then cooked under heat and pressure imposed between an opposing pair of heating surfaces to drive out moisture and toast the slices.

Also, U.S. Pat. No. 4,873,093 discloses a product and process for preparing a baked snack food from gelatinized starch ingredients wherein at least one ingredient having starch, such as potatoes, is mixed with water to form a composition which is steamed to form a dough-like consistency. The dough-like composition is then machined to form pieces which are baked in a conventional oven. The exterior layer of the dough-like composition cooks rapidly during baking and traps steam in the interior portion of the dough. An alternative embodiment includes spraying vegetable oil onto the pieces prior to baking to obtain a final product having a flat, oil-containing cracker-like appearance. A post-bake oil application is optional and included in a preferred embodiment.

U.S. Pat. No. 5,298,707 teaches a process and apparatus for preparing fat-free snack chips by exposing sliced raw potatoes, and the like, to a high intensity microwave field that rapidly converts moisture within the slice to steam. The exposed slices are then dried by longer exposure to a lower energy microwave field with an elaborate microwave apparatus. The resulting chip product, which has not been fried in oil will lack the flavor which appeals to the typical consumer of snack foods.

Another attempt at making fat-free snack foods is taught in U.S. Pat. No. 5,370,898 which discloses a process for producing food chip products which does not involve oil-based cooking. The process includes slicing and/or shaping a food, such as potatoes, then washing starch from the sliced, or shaped food, with water then forming multiple layers of the food product. The multiple-layered food product is baked in an impingement oven under conditions sufficient to form a fluidized bed of layered food product. The pressure is varied within the impingement oven to further release moisture. After baking, the shaped food forms are dried and optionally seasoned. This process, like those previously discussed, fails to produce a fried snack product substantially free of oil and which still has most, of not all, of the flavor generated by the frying step.

While conventional solvent extraction methods have met with various degrees of commercial success, they all require relatively high pressures and temperatures. Consequently, there remains a need in the art for an improved solvent extraction method which is more energy and cost efficient and which does not require elevated temperatures and pressures

SUMMARY OF THE INVENTION

In accordance with the present invention, there is provided a process for reducing the amount of oil from an oil-containing material, which process comprises contacting the oil-bearing material in an extraction zone for an effective amount of time in a suitable solvent at temperatures below about 0° at substantially atmospheric pressure.

In a preferred embodiment of the present invention, the solvent is a normally gaseous solvent at room temperature and atmospheric pressure and the temperature of extraction is the boiling point of the solvent at substantially atmospheric pressure.

In another preferred embodiment of the present invention two or more extraction stages are present and the oil-bearing material is passed through each of the extraction stages until the desired level of oil removal is achieved.

In yet another preferred embodiment of the present invention air is removed from the extraction zone prior to introduction of the solvent.

In still another preferred embodiment of the present invention the partially extracted material is subjected to a vacuum between one or more extraction stages.

In other preferred embodiments of the present invention the oil-bearing material is a cooked food product.

In still other preferred embodiments of the present invention, the food product is an agricultural food product selected from fried snack foods, more preferably potato chips and corn chips.

In yet another preferred embodiment of the present invention the oil-bearing material is a material selected from both the plant kingdom and the animal kingdom. For example, preferred plant products include hemp; tobacco; vegetables, such as garlic; seeds, particularly soybeans, flax seed, rapeseed, mustard seed, salseed, sesame seed, cottonseed, linseed; nuts such as peanuts and pistachios; cereals such as rice bran, wheat bran, and corn meal. Non-limiting examples of organic materials from the animal kingdom include the vertebrates, such as fish, mammals, and birds; and the arthropods, preferably the crustaceans, such as lobsters, crabs, and shrimp. Included in the above are also crawfish and the shells thereof, animal parts; dairy products, such as cheese, particularly grated cheese; as well as small particle organic products such as food coatings.

In another preferred embodiment of the present invention the oil component is selected from the group consisting of phospholipids, fish oils, plant oils, fats, fatty acids, alcohols, cholesterol, waxes, gums, stearoids, oil soluble proteins, flavonol, essential oils, natural dyes, PCBs, and oil-soluble vitamins.

In yet another preferred embodiment of the present invention, the normally gaseous solvent is selected from methane, ethane, propane, butane, isobutane, butylene, hexane, sulfur dioxide, carbon dioxide, $CHF_3$, $CCIF_3$, $CFBr_3$, $CF_2=CH_2$, $CF_3-CF_2-CF_3$, $CF_4$, $CF_4$, $CH_3-CF_3$, $CHCl_2$, ammonia, nitrogen, nitrous oxide, dichlorodifluoromethane, dimethylether, $C_1-C_4$ alkyl acetates, methyl fluoride, and halogenated hydrocarbons which are normally gaseous.

In another preferred embodiment of the present invention, the extraction zone is subjected to conditions which will repeatedly stress and relax the oil and/or solvent molecules.

In still other preferred embodiments of the present invention, the oil-extracted food product is subjected to microwaves in other to aid in the removal of residual amounts of solvent from the substantially de-oiled product.

DETAILED DESCRIPTION OF THE INVENTION

Any oil-bearing naturally occurring organic material can be treated to selectively remove substances by the solvent extraction method of the present invention. Non-limiting examples of such materials include materials from both the plant kingdom and the animal kingdom. For example, preferred plant products include hemp; leaves, including tobacco leaves; vegetables, such as garlic; seeds, particularly soybeans, flax seed, rapeseed, mustard seed, salseed, sesame seed, cottonseed, linseed; nuts such as peanuts and pistachios; cereals such as rice bran, wheat bran, and corn meal. Non-limiting examples of organic materials from the animal kingdom include the vertebrates, such as fish, mammals, and birds; and the arthropods, preferably the crustaceans, such as lobsters, crabs, and shrimp. Included in the above are also crawfish and the shells thereof, animal parts; as well as small particle organic products such as food coatings. Other oil-bearing materials that can be treated in accordance with the present invention include oil-laden dirt and clayhs, as well as water laden algae. Non-limiting examples of the types of substances which can be removed from such materials include phospholipids, fish oils, plant oils, fats, fatty acids, alcohols, cholesterol, waxes, gums, stearoids, oil soluble proteins, flavonol, essential oils, natural dyes, PCBs, and oil-soluble vitamins. The present invention can also be used to clean oil-based material from filters and membranes.

Also, any oil-bearing cooked food product can be used in the practice of the present invention. The food product will typically be an agricultural or animal derived food product, but it can also be a nutraceutical/pharmaceutical material. The term "oil-bearing agricultural food product", as used herein refers to any food product which contains oil and which is grown as a crop. The oil can be inherent in the food or it can be extraneous oil which is adsorbed and/or absorbed during a cooking process, particularly by frying in a cooking oil. Preferred agricultural food products are those which can typically be reshaped directly from the raw state. Such foods include bananas, plantains, potatoes, yams, turnips, and sweet potatoes, and the like. Other foods, such as lice and corn, can also be manipulated to form slices and can also be used in the process of the present invention. For example, corn food products can be popcorn, which is cooked in hot oil, or can be prepared initially by forming a dough from water and corn flour. The dough can then be extruded, and cut into the desired shape for frying There are many variations on this basic procedure for manipulating flour or dough into a shape suitable for frying. For example, see U.S Pat. No. 3,600,193 (mixing corn flour with seasonings); U.S. Pat. No. 3,922,370 (mixing water, rice, and rice flour); and U.S. Pat. No. 3,348,950) mixing corn, sucrose, water, and corn grits), all of which are incorporated herein by reference. Generally, the process of the present invention can be used with all foods that are cooked, preferably fried, in oil. The term "fried" as used herein means to cook in hot oil or fat. Consequently, the terms "cooked" and "fried" are used interchangeably in this application. It is to be understood that the terms "oil" and "fat" are often used interchangeably herein. Oils are typically a liquid at room temperature and fats are usually solid. Further, the term "fat-free", as defined by the United States Food and Drug Administration means a food product containing less than about 0.5 wt. % fat, based on the total weight of the food product. The process of the present invention will work substantially equally for both oils and fats. In other words, the present invention will be used on any agricultural food product that contains oil as an inherent constituent, or which was previously cooked in fat or oil and has picked-up cooking oil during cooking. The term "animal-derived", as used herein, refers to any food product that is derived from the animal kingdom; preferably the vertebrates, such as fish, mammals, and birds; and the arthropods, preferably the crustaceans, such as lobsters, crabs, and shrimp. Also included in the term "animal-derived" are dairy products, preferably cheese. Other preferred animal-derived food products include bacon, and pork rinds.

It is within the scope of the present invention that fat substitutes can also be extracted from foods cooked therein, as long as it is at least partially soluble in the solvent for its removal. Preferred are fat substitutes which are suitable for use at cooking and frying temperatures. The term "fat substitute", as used herein means any edible material which is substantially non-digestible, which has the mouth feel of dietary fat, and which can be used in a food preparation process where fat or oil (i.e., triglyceride fat) is normally employed, in total or partial replacement. By "nondigestible" is meant that only about 70% or less, preferably only about 20% or less, and more preferably only about 1% or less of such materials can be digested by the human body.

Alternatively, "nondigestible" can also mean that only about 70% or less, preferably only about 20% or less, more preferably only about 1% or less, of a material can be hydrolyzed, versus a triglyceride, by the enzymes in the lipase test described in U.S. Pat. No. 5,422,131 to Proctor and Gamble, which is incorporated herein by reference.

Any suitable cooking technique using oil and/or fat can be used for the food product of the present invention. Typically the food product, if an animal-derived food product, will be a so-call "fast food" such as hamburgers (chopped meat), bacon, fined chicken, pork rinds, and fined fish products. If the food product is an agricultural food product, it will preferably be a potato or corn based product, more preferably potato chips and corn chips. The thrust of the present invention is not with the actual cooking, or frying, of the food product, but with removing oils and fats after cooking, without substantially altering the taste of the product. By the practice of the preferred mode of the present invention, the food product is first fried in oil by any conventional means to ensure superior flavor—then the oil is removed. The oil is removed by use of what applicant refers to as "cold extraction". That is, the food product, after frying, is contacted with a normally gaseous solvent at relatively low temperatures.

Solvents suitable for use in the present invention are effective solvents. That is, which are a liquid at extraction conditions, and in which the compound to be extracted is soluble under extraction conditions. It is preferred that the solvent be non-toxic (eatable). Preferred solvents are those which are normally gaseous at typical atmospheric conditions. That is, those which are a gas at about room temperature (about 70° F.) and atmospheric pressure. Non-limiting examples of preferred solvents include methane, ethane, ethylene, propylene propane, butane, isobutane, butylene, hexane, sulfur dioxide, nitrous oxide, carbon dioxide, $CHF_3$, $CClF_3$, $CFBr_3$, $CF_2=CH_2$, $CF_3-CF_2-CF_3$, $CF_4$, $CF_4$, $CH_3-CF_3$, $CHCl_2$, ammonia, nitrogen, nitrous oxide, dichlorodifluor methane, dimethylether, $C_1-C_4$ alkyl acetates, methyl fluoride, and halogenated hydrocarbons which are normally gaseous. Preferred are of methane, ethane, isobutane, sulfur dioxide, nitroogen oxides, methyl acetate, and ethyl acetate. More preferred are isobutane, sulfur oxides, and methyl acetate. The weight ratio of solvent to agricultural food product will be from about 1:1 to 2:1, preferably from about 1.2:1 to 1.5:1. A co-solvent, such as a $C_2$ to $C_6$ alcohol, preferably ethanol, may be used. If a co-solvent is used it may be used in place of at least about 5 to 90 vol. %, preferably about 5 to 50 vol. %, and more preferably from about 5 to 25 vol. %, of the primary solvent. Other components can also be present in the solvent, such as enzymes.

The apparatus used in the practice of the present invention, in its simplest form, will contain an extraction zone, a separation zone, and a storage vessel for the solvent. The process of the present invention is practiced by introducing the solvent into the extraction zone under conditions so that it remains a liquid, but at substantially atmospheric pressure. The preferred temperature of the solvent during extraction will be less than ambient temperature (15° C.) and preferably the boiling point of the solvent at substantially atmospheric pressure. The most preferred solvents are isobutane and propane, and mixtures thereof. It is preferred that air be removed from the extraction zone prior to introduction of the solvent. It is also within the scope of this invention that the solvent is in the form of a dense vapor.

The cold solvent extraction process of the present invention as the great advantage of not destroying valuable components such as proteins, peptides, vitamins etc., which are susceptible to degradation when the oil-bearing materials are subjected to solvent extraction at elevated temperatures.

The oil-bearing material is then introduced into extraction zone and contacted with liquid solvent. It is preferred that the oil-bearing material be submerged in the solvent, more preferably it is passed through the solvent on a suitable transport mechanism, such as a conveyor belt or screw device. The extraction zone can be composed of multiple extraction stages, each stage containing liquid solvent in a suitable vessel at conditions that will not cause rapid boiling of the solvent at atmospheric pressure. It is to be understood that some boiling of the solvent will occur as the oil-bearing material is passed through the solvent owing to the fact that the oil-bearing material will be at substantially higher temperatures than the solvent. It is preferred that this boiling be controlled by letting the pressure of the extraction zone rise to a suitable level, but not so high that boiling stops and elevated temperatures are required.

The extraction zone can be comprised of one or more vessels suitable for the volumes, temperatures, and pressures employed. Non limiting types of vessels that may be used for the extraction zone include fixed-bed, slurry-bed, moving-bed vessels, as well as vessels in which the food product is fed there-through on a belt, or with a screw, or on or in a bucket. It is preferred that the vessel be one in which the oil-bearing material passes through a pool of solvent.

As previously mentioned, it is preferred to evacuate the extraction zone prior to introduction of solvent, especially if the solvent is solvent like propane which could possibly form an explosive mixture with air. The evacuation can be conducted in any suitable manner, such as, by use of a vacuum pump or by merely venting the air into the atmosphere as it is displaced by the solvent during solvent loading. Of course, any combustible solvent that contaminates the vented air can be burned-off during venting. It is also within the scope of the present invention that the extraction zone be flushed with an inert gas, preferably nitrogen, prior to introduction of the solvent. It is preferred that the inert gas be introduced at a temperature as close to the desired operating temperature of the extraction zone as possible.

It is preferred that the oil-bearing material be dry before being contacted with the solvent in order to mitigate, or prevent, freezing which may occur during certain stages of this process. While the heated inert gas can be used to dry the food product, it may also be dried by any other appropriate means, such as by heating it by conventional means, including the use of microwaves.

It is preferred that the normally gaseous solvent be fed into the extraction zone in a liquid state under substantially atmospheric pressure. The extraction zone will be operated at substantially atmospheric pressure. The temperature used for the extraction will be dependent on the solvent employed. That is, the temperature will typically be the boiling point of the solvent at substantially atmospheric pressure. Of course, these temperatures may vary slightly for any given food product and solvent combination, and the precise conditions are within the skill of those having ordinary skill in the art given the teaching herein.

The extraction zone can also be subjected to conditions that will repeatedly stress and relax the oil and/or solvent molecules. Such stressing and relaxation can be caused by fluctuating the pressure of the extraction zone by at least about ¼ psig, preferably by at least about ½ psig, more preferably by at least 1 psig, and most preferably by at least 5 psig. Actuating and deactuating a piston or diaphragm in the pressure or solvent line can cause this pressure fluctuation The stressing and relaxation conditions can also be caused by sonication. That is, by subjecting the ingredients of the extraction zone to sonic energy.

The extraction of the present invention will preferably be accomplished in more than one extraction. That is, the oil-bearing material will undergo two or more extractions with solvent in order to assure a more efficient extraction of oil. For example, a first extraction may leave as much as 3 to 10 vol. % of the oil in the material. A substantial amount of this residual oil can then be removed by subjecting the oil-bearing material to at least one more extraction. Of course, the economics of the process must be considered so that the cost of additional extractions does not exceed the value of the added products from the additional extractions.

The solvent is maintained in contact with the food product for an effective period of time. That is, for a period of time which will result in the extraction of a predetermined amount of oil.

After extraction, the solvent/oil mixture is passed from the extraction zone to a separation zone. If the solvent in the extraction zone is in the liquid phase, then it is preferred that the solvent is passed to the separation zone under conditions that will maintain the solvent as a liquid. This can be accomplished in several ways. For example, the extraction zone can be heated to cause an increase in pressure so that the solvent/oil mixture is forced out of the extraction zone and into the separation zone. After substantially all of the solvent/oil mixture is passed to the separation zone the extraction zone is sealed off from the separation zone. One reason to move the solvent/oil mixture to the separation zone in a liquid state is to prevent unnecessary evaporation of solvent resulting in freezing of the extracted material. Another way cause the solvent/oil mixture to pass from the extraction zone to the separation zone is to introduce a flush gas, preferably an inert gas such as nitrogen, into the extraction zone to replace the leaving solvent/oil mixture. By "inert gas" is meant a gas which will not have a deleterious effect on the food product or extracted oil which can be recycled for cooking a fresh batch of food product. It will preferably be gas in which the oil is substantially not soluble, either when the gas is in a gaseous form or if it should liquefy under process conditions. The flush gas will also preferably be one which is dissimilar to the solvent used herein. For example, it will be a gas, which at a given temperature will liquefy at a higher pressure than the solvent. In other words, it is preferred that the inert gas be a gas and not a liquid at extraction conditions. The flush gas replaces the solvent/oil mixture in the extraction zone and maintains substantially the same pressure throughout the solvent/oil removal step. It is preferred that the flush gas be heated. That is, that it be at a temperature that will cause the extracted food product to be from about 90° F. to 140° F., preferably from about 100° F. to 120° F. This heated flush gas can enhance the recovery of any residual oil and solvent left in the de-oiled food product. It is also within the scope of this invention that solvent vapor be passed through the de-oiled food product either in place of the flush gas or following the passage of flush gas. This solvent vapor will act to remove at least a portion of the residual oil left in the de-oiled food product. Any remaining solvent can be removed from the final product by use of a vacuum or flushing with a gas such as nitrogen. It is also within the scope of the present invention to use microwaves to remove residual amounts of solvent from the de-oiled food product.

The separation zone is run under conditions that will enhance the separation of solvent from the oil. It is preferred that heat be applied to enhance this separation. Other conditions for operating the separation zone to enhance solvent/oil separation include distillation, centrifugation, and reduced pressures. The separated solvent is then passed to a storage zone where it can be recycled to the extraction zone. Makeup solvent, if needed, can be added. At least a portion of the recovered solvent can be recycled directly to the extraction zone.

It is preferred that the oil-bearing material be subjected to reduced pressures between extraction stages, as well as after the last extraction stage, to enhance the removal of residual solvent. This reduced pressure will typically be less than about 10 psig, more preferably to a pressure about 0 psig, and most preferably to a pressure wherein the exaction zone is under vacuum Various ingredients can be added to the oil-bearing material, especially if it is a cooked food product, either during or after extraction. Non-limiting examples of ingredients that can be added include vitamins and flavorings, including salt. Any suitable method can be used to add the ingredients to the food product. For example, after extraction, flavoring can be added to the substantially oil free food product by spaying the extracted food product with a light layer of oil containing the desired flavor. Flavoring can also be added during extraction by including the flavoring in the solvent used to extract the oil from the food product. It as been found by the inventor hereof that when flavoring is added to the solvent, at least some of the flavoring remains on the food product after extraction. The flavoring can also be added after extraction by passing additional flavor-containing solvent over the food product before removal from the extraction zone.

The present invention can be more fully understood by reference to the following examples, which are not to be taken as being limited in anyway, and which are presented to illustrate the present invention.

EXAMPLE 1

Four hundred and thirty six grams of full fat crinkle cut potato chips, containing 34.2 wt. % fat; were placed into an open vessel. The chips were covered with isobutane. The pressure above the liquid isobutane and chips was maintained at one atmosphere by a slow evacuation of isobutane. An equilibrium temperature of 5° F. was established and maintained. After thirty minute of extraction, the isobutane was drained from the chips. Residual isobutane was removed by vacuum purging. An analysis of the processed chips found a residual fat content of 13.2 wt. %

EXAMPLE 2

Four hundred and seven grams of full fat crinkle cut potato chips, containing 34.2 wt. % fat were placed into a closed pressure reactor. Air was removed from the reactor by vacuum. The reactor was filled with isobutane. An equilibrium pressure and temperature of 50 psi and 70° F. was established. The chips were processed for thirty minutes. The isobutane was drained from the reactor and the reactor was vacuum purged to remove residual vapors. An analysis of the processed chips found a residual fat content of 12.2 wt. %.

EXAMPLE 3

Four hundred grams of full fat crinkle cut potato chips, containing 34.2 wt. % fat, were placed into an open vessel. The chips were covered with isobutane. The pressure above the liquid isobutane and chips was maintained at one atmosphere by a slow evacuation of isobutane. An equilibrium temperature of 5° F. was established and maintained. After thirty minute extraction, the isobutane was drained from the chips. Residual isobutane was removed by vacuum purging. The chips were subjected to a second extraction under the same process conditions. An analysis of the processed chips found a residual fat content of 7.0 wt. %.

EXAMPLE 4

Four hundred and thirty two grams of full fat crinkle cut potato chips, containing 34.2% fat, were placed into an open vessel. The chips were covered with isobutane. The pressure above the liquid isobutane and chips was maintained at one atmosphere by a slow evacuation of isobutane. An equilibrium temperature of 5° F. was established and maintained. After thirty minute extraction, the isobutane was drained from the chips. Residual isobutane was removed by vacuum purging. The chips were subjected to a second and third thirty minute extractions under the same process conditions. An analysis of the processed chips found a residual fat content of 1.2 wt. %

EXAMPLE 5

Three hundred and ninety seven grams of full fat crinkle cut potato chips, containing 34.2 wt. % fat, were placed into a closed pressure reactor Air was removed from the reactor by vacuum. The reactor was filled with isobutane. An equilibrium pressure and temperature of 50 psi and 70° F. was established. The chips were processed for thirty minutes. The isobutane was drained from the reactor and the reactor vacuum purged to remove residual vapors. A second, thirty minute extraction was performed using the same process conditions. An analysis of the processed chips found a residual fat content of 5.3 wt. %

EXAMPLE 6

Whole Fish samples received from Starkist were ground. Three thousand one hundred and eight grams of the ground fish was placed in an open container and covered with isobutane. The pressure was maintained at one atmosphere by venting of isobutane. An equilibrium temperature of 5° F. was achieved. The ground fish was extracted for one hour. The meal was mechanically stirred every five minutes. The meal became stiff but did not freeze. After extraction the isobutane was drained from the vessel and residual isobutane was removed by nitrogen sparging. The extraction was repeated a second time. Three hundred and forty two grams of a clear yellow fish oil was obtained. This represents 10.7 wt. % of the original weight of fish.

EXAMPLE 7

A one hundred sixty two gram sample of sugar cane press cake was extracted by placing in an open vessel and covering with isobutane. The pressure was maintained at one atmosphere by venting and a equilibrium temperature of 6° F. was established. The sugar cane press cake was extracted for one hour with stirring. The solvent was drained from the cake and the extracted wax was recovered from the solvent by distillation. A light, yellow color wax weighing 2.75 grams was recovered. The 1.7 wt. % recovery compares well with a report content of 1.8 wt. %

EXAMPLE 8

Fourteen hundred and thirty three grams of Olive Pomace (5 days old) was extracted with isobutane at one atmosphere pressure and 5° F. temperature for thirty minutes. The solvent was drained and the pomace extracted again at atmospheric pressure for thirty minutes. The extracted olive oil was recovered by cold vacuum stripping of the solvent. One hundred forty seven grams or 10.3 wt. % of a light green olive oil was obtained. The olive oil had a free fatty acid content of less than 0.65 wt. %. Industry normally recovers only 5 to 7 wt. % of a dark colored high free fatty acid oil from the pomace.

What is claimed is:

1. A process for reducing the amount of oil from an oil-containing material, which process comprises contacting the oil-bearing material in an extraction zone for an effective amount of time with a normally gaseous solvent in the liquid state at temperatures below about 0° and at substantially atmospheric pressure.

2. The process of claim 1 wherein the normally gaseous solvent is selected from methane, ethane, propane, butane, isobutane, butylene, hexane, sulfur dioxide, carbon dioxide, $CHF_3$, $CCIF_3$, $CFBr_3$, $CF_2=CH_2$, $CF_3-CF_2-CF_3$, $CF_4$, $CF_4$, $CH_3-CF_3$, $CHCl_2$, ammonia, nitrogen, nitrous oxide, dichlorodifluor methane, dimethylether, $C_1-C_4$ alkyl acetates, methyl fluoride, and halogenated hydrocarbons which are normally gaseous.

3. The process of claim 2 wherein the temperature of extraction is at about the boiling point of the solvent at substantially atmospheric pressure.

4. The process of claim 1 wherein two or more extraction stages are present and the oil-bearing material is passed through each of the extraction stages until the desired level of oil removal is achieved.

5. The process of claim 1 wherein air is removed from the extraction zone prior to introduction of the solvent.

6. The process of claim 3 wherein the extracted material is subjected to a vacuum between extraction stages.

7. The process of claim 3 wherein air is removed from the extraction zone prior to introduction of the solvent and wherein the extracted material is subjected to a vacuum between extraction stages.

8. The process of claim 1 wherein the oil-bearing material is a cooked food product.

9. The process of claim 8 wherein the cooked food product is an agricultural food product selected from fried snack foods.

10. The process of claim 9 wherein the fried snack food is selected from the group consisting of potato chips and corn chips.

11. The process of claim 1 wherein the oil-bearing material is a plant material selected from the group consisting of hemp; tobacco; vegetables, nuts, cereals, and oil seeds.

12. The process of claim 11 wherein the oil-bearing material is an oil-seed selected from the group consisting of soybeans, flax seed, rapeseed, mustard seed, salseed, sesame seed, cottonseed, linseed.

13. The process of claim 11 wherein the oil-bearing material is a cereal selected from the group consisting of rice bran, wheat bran, and corn meal.

14. The process of claim 1 wherein the oil-bearing material is a material from the animal kingdom selected from the group consisting of fish, mammals, birds, and crustaceans.

15. The process of claim 14 wherein the crustaceans are selected from the group consisting of lobsters, crabs, and shrimp.

16. The process of claim 1 wherein the oil component is selected from the group consisting of phospholipids, fish oils, plant oils, fats, fatty acids, alcohols, cholesterol, waxes, gums, stearoids, oil soluble proteins, flavonol, essential oils, natural dyes, PCBs, and oil-soluble vitamins.

17. The process of claim 3 wherein the oil-bearing material is a cooked food product.

18. The process of claim 17 wherein the cooked food product is an agricultural food product selected from fried snack foods.

19. The process of claim 18 wherein the fried snack food is selected from the group consisting of potato chips and corn chips.

20. The process of claim 3 wherein the oil-bearing material is a plant material selected from the group consisting of hemp; tobacco; vegetables, nuts, cereals, and oil seeds.

21. The process of claim 20 wherein the oil-bearing material is an oil-seed selected from the group consisting of soybeans, flax seed, rapeseed, mustard seed, salseed, sesame seed, cottonseed, linseed.

22. The process of claim 20 wherein the oil-bearing material is a cereal selected from the group consisting of rice bran, wheat bran, and corn meal.

23. The process of claim 3 wherein the oil-bearing material is a material from the animal kingdom selected from the group consisting of fish, mammals, birds, and crustaceans.

24. The process of claim 23 wherein the crustaceans are selected from the group consisting of lobsters, crabs, and shrimp.

25. The process of claim 3 wherein the oil bearing material is a cheese.

26. The process of claim 1 wherein the extraction zone is subjected to conditions which will repeatedly stress and relax the oil and/or solvent molecules.

27. The process of claim 1 wherein the oil-extracted food product is subjected to microwaves in other to aid in the removal of residual amounts of solvent from the substantially de-oiled product.

* * * * *